(12) United States Patent
Voorhees et al.

(10) Patent No.: US 9,436,636 B2
(45) Date of Patent: Sep. 6, 2016

(54) STRUCTURE FOR NON-BLOCKING SERIAL ATTACHED SCSI INFRASTRUCTURE UTILIZING VIRTUAL PATHWAYS

(71) Applicant: LSI Corporation, Milpitas, CA (US)

(72) Inventors: William W. Voorhees, Colorado Springs, CO (US); Srikiran Dravida, Colorado Springs, CO (US); Timothy E. Hoglund, Colorado Springs, CO (US); William K. Petty, Colorado Springs, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 310 days.

(21) Appl. No.: 13/710,133

(22) Filed: Dec. 10, 2012

(65) Prior Publication Data

US 2014/0164670 A1 Jun. 12, 2014

(51) Int. Cl.
*G06F 13/40* (2006.01)
*G06F 3/06* (2006.01)

(52) U.S. Cl.
CPC ............ *G06F 13/4022* (2013.01); *G06F 3/061* (2013.01); *G06F 3/0635* (2013.01); *G06F 3/0683* (2013.01)

(58) Field of Classification Search
CPC .......................... G06F 13/385; G06F 13/4022
USPC ............................................................ 710/316
See application file for complete search history.

(56) References Cited

U.S. PATENT DOCUMENTS

| 7,444,459 | B2 * | 10/2008 | Johnson | 711/6 |
|---|---|---|---|---|
| 7,624,223 | B2 * | 11/2009 | Clegg et al. | 710/316 |
| 8,127,059 | B1 * | 2/2012 | Carr et al. | 710/74 |
| 8,626,981 | B1 * | 1/2014 | Roberts et al. | 710/316 |
| 2012/0191886 | A1 * | 7/2012 | Ballard et al. | 710/106 |

* cited by examiner

*Primary Examiner* — Brian Misiura

(57) ABSTRACT

Structure is disclosed for a non-blocking SAS architecture utilizing virtual connections between SAS devices. One embodiment comprises a SAS expander. The SAS expander comprises a plurality of physical links (PHYs) and a Virtual Connection Manager (VCM) coupled with the plurality of PHYs. The VCM exchanges information over a plurality of concurrently established virtual pathways between a first PHY of the plurality of PHYs and a second PHY of the plurality of PHYs.

19 Claims, 9 Drawing Sheets

FIG. 8 per-Phy VCI Table ~ 800

| Ingress VCI | Egress Phy[7:0] | Egress VCI[7:0] | Pointer Next[7:0] | Pointer Prev[7:0] | Priority[3:0] | State[3:0] |
|---|---|---|---|---|---|---|
| 0x0 | Reserved for legacy interworking function in expander | | | | | |
| 0x1 | Reserved for inter-expander communication | | | | | |
| 0x2 | Egress Phy[7:0] | Egress VCI[7:0] | Pointer Next[7:0] | Pointer Prev[7:0] | Priority[3:0] | State[3:0] |
| 0x3 | Egress Phy[7:0] | Egress VCI[7:0] | Pointer Next[7:0] | Pointer Prev[7:0] | Priority[3:0] | State[3:0] |
| ... | ... | ... | ... | ... | ... | ... |
| 0xFF | Egress Phy[7:0] | Egress VCI[7:0] | Pointer Next[7:0] | Pointer Prev[7:0] | Priority[3:0] | State[3:0] |
|  | ↑ 802 | ↑ 804 | ↑ 806 | ↑ 808 | ↑ 810 | ↑ 812 |

814 → Ingress VCI

STRUCTURE FOR NON-BLOCKING SERIAL ATTACHED SCSI INFRASTRUCTURE UTILIZING VIRTUAL PATHWAYS

BACKGROUND

1. Field of the Invention

The invention relates generally to serial attached SCSI (SAS) domains, and more specifically, relates to improving the performance of SAS domains.

2. Discussion of Related Art

Serial Attached SCSI (SAS) is a popular protocol and medium for connecting the components of a networked storage/computing architecture. In general, SAS standards define a SAS domain as including one or more SAS initiators coupled with one or more SAS target devices through zero or more SAS expander devices. In general, a SAS initiator device is coupled with a SAS target device as a point-to-point connection. To enhance the flexibility in connecting a SAS initiator device to other SAS target devices, a SAS domain may include one or more SAS expanders to provide, in essence, a switched fabric for coupling any of the SAS initiators in a point-to-point connection to any of the SAS target devices of the SAS domain.

More generally SAS initiators and SAS target devices may each be referred to as SAS endpoints in that many SAS devices may act in the role of an initiator at times and may act in the role of a target at times. Regardless of the role of a device as a SAS initiator or as a SAS target, any SAS compliant endpoint may attempt to open a connection with another endpoint. It is common, for example, for a host bus adapter SAS initiator to open a connection to a SAS storage device. However, the storage device may later open a connection back to a requesting host adapter for purposes of returning requested read data. Both initiator and target devices in a connection may simply be referred to herein as a "SAS endpoint device". SAS endpoint devices and SAS expanders may be referred to herein as "SAS devices".

The SAS standards provide for a full duplex connection between two connected SAS endpoints. In principle, such a full duplex connection allows the opening endpoint to transmit frames of information (e.g., data frames) to the opened endpoint substantially in parallel with the opened endpoint transmitting information back to the opening endpoint. In accordance with these SAS specifications, such a full duplex connection allows for near full utilization of the point-to-point connection between the two SAS endpoints (some available bandwidth is always consumed by overhead exchanges associated with the protocols, and in practice it is rare to achieve full utilization due to imbalances in traffic going in either direction between the SAS endpoints). This and other related SAS specifications are well known to those of ordinary skill in the art and are also readily available at www.t10.org, such as SAS 2.0, revision 16, published 18 Apr. 2009 and incorporated by reference herein.

In practice, it is difficult in the SAS domain to ensure a predictable level of performance across all SAS endpoints in large topologies due to the blocking nature of open SAS connections and the variability in the duration of those connections. For example, during the SAS connection process, a SAS initiator transmits an Open Address Frame (OAF) towards the target. The OAF is propagated through the intermediate expander connections between the initiator and the target as long as the intermediate paths along the route are available. If any of the intermediate paths are not available, then the connection request is delayed while arbitration is performed at the intermediate expander connections, and sometimes, an open reject message is returned to the initiator, blocking the connection attempt. This may result in unpredictable and/or chronically poor performance for certain endpoint devices in the topology. Thus, new connection requests that require inter-expander pathways that are in use may be delayed (rejected) until the established connection is closed. This is one driver of the unpredictability in typical SAS domains.

It is evident from the above discussion that an ongoing need exists to improve the performance of SAS domains.

SUMMARY

The present invention addresses the above and other problems, thereby advancing the state of the useful arts, by providing structure for a non-blocking SAS architecture utilizing virtual connections between SAS devices. Virtual connections are implemented by encapsulating SAS frames and primitives within one or more routable virtual SAS cells. The use of virtual SAS cells allows for a connectionless virtual SAS to be implemented. This virtual SAS allows for connectionless routing, concurrent virtual pathways on a single link, etc., which improves the performance of SAS.

One embodiment is a SAS expander. The SAS expander includes a plurality of physical links (PHYs). The SAS expander further includes a Virtual Connection Manager (VCM) that is coupled with the plurality of PHYs. The VCM is adapted to exchange information over a plurality of concurrently established virtual pathways.

In another embodiment, the VCM is adapted to receive SAS frames, to segment the SAS frames into a plurality of virtual SAS cells, and to transmit the plurality of virtual SAS cells utilizing a plurality of established virtual pathways between a first PHY of the plurality of PHYs and at least two PHYs of the plurality of PHYs.

In another embodiment, the VCM is adapted to receive a plurality of virtual SAS cells comprising segmented SAS frames at a first PHY of the plurality of PHYs, to determine a virtual pathway specified by each of the plurality of virtual SAS cells, and to forward each of the plurality of virtual SAS cells from the first PHY along a specified virtual pathway to one of the plurality of PHYs.

BRIEF DESCRIPTION OF THE DRAWINGS

FIG. 8 illustrates an exemplary per-PHY VCI table in accordance with features and aspects hereof.

DETAILED DESCRIPTION OF THE DRAWINGS

Figure 1:
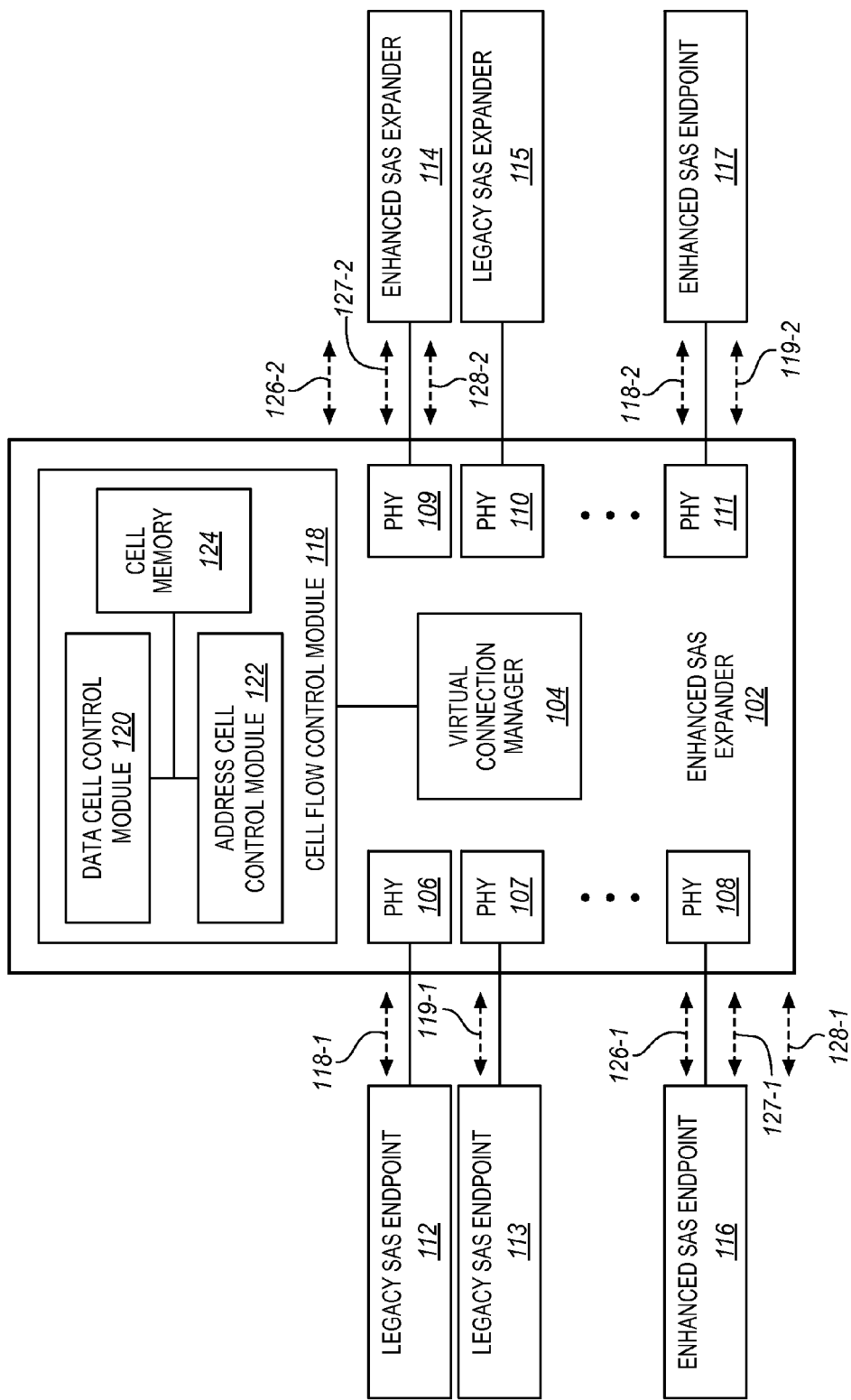
FIG. 1 is a block diagram of an exemplary SAS expander implementing a non-blocking SAS architecture utilizing virtual pathways in accordance with features and aspects hereof.

FIG. 1 is a block diagram of an exemplary enhanced SAS expander 102 enabling a non-blocking SAS architecture utilizing virtual pathways in accordance with features and aspects hereof. In this embodiment, enhanced expander 102 includes a plurality of PHYs 106-111, and a Virtual Connection Manager (VCM) 104. In some embodiments, enhanced expander 102 may also include a cell flow control module 118, which will be discussed later. Each of PHYs 106-111 are coupled with a corresponding SAS device 112-117. In this embodiment, PHYs 106-107 are coupled with legacy SAS endpoints 112-113, and PHY 110 is coupled with a legacy SAS expander 115. Legacy SAS endpoints 112-113 and legacy SAS expander 115 support one open connection at a time across a physical link, as is typical in the SAS point-to-point protocol. As discussed herein, "legacy" SAS devices are not enhanced in accordance with features and aspects hereof.

PHYs 108-109 and 111 of enhanced expander 102 in this embodiment are coupled with an enhanced SAS endpoint 116, an enhanced SAS expander 114, and an enhanced SAS endpoint 117, respectively. Enhanced SAS endpoints 116-117 and enhanced expander 114 support multiple concurrent open connections by encapsulating SAS frames and SAS primitives within one or more routable virtual SAS cells. By wrapping SAS frames and SAS primitives (also collectively referred to herein as SAS communication or SAS communications) within the virtual SAS cells, SAS communication can be routed and exchanged more efficiently within a SAS domain. For example, enhanced SAS endpoint 117 in this embodiment illustrates two concurrent virtual pathways 118-2 and 119-2. Virtual pathway 118-2 corresponds to a legacy SAS pathway 118-1 between SAS endpoint 112 and enhanced expander 102. Virtual pathway 119-2 corresponds to a legacy SAS pathway 119-1 between legacy SAS endpoint 113 and enhanced SAS expander 102. Also illustrated in FIG. 1 are three concurrently open virtual pathways 126-128 between enhanced SAS endpoint 116 and enhanced expander 114.

During operation of enhanced expander 102, VCM 104 converts SAS communications between legacy SAS and the virtual SAS cells utilized by the enhanced devices depending on the type of device that is coupled with enhanced expander 102. If the device is a legacy SAS device, such as legacy SAS endpoint 112, then VCM 104 converts SAS communications between the legacy SAS protocol and the virtual SAS cells depending on the direction the data is flowing. For example, as SAS information flows from enhanced expander 102 to legacy endpoint 112, VCM 104 converts virtual SAS cells to the legacy SAS protocol. As SAS information flows from legacy endpoint 112 to enhanced expander 102, VCM 104 converts the legacy SAS protocol to virtual SAS cells. If the device is an enhanced SAS device, such as enhanced SAS endpoint 117 or enhanced SAS expander 114, then VCM 104 provides the SAS communication within the virtual SAS cells end-to-end without converting the SAS communication back to legacy SAS.

Figure 2:
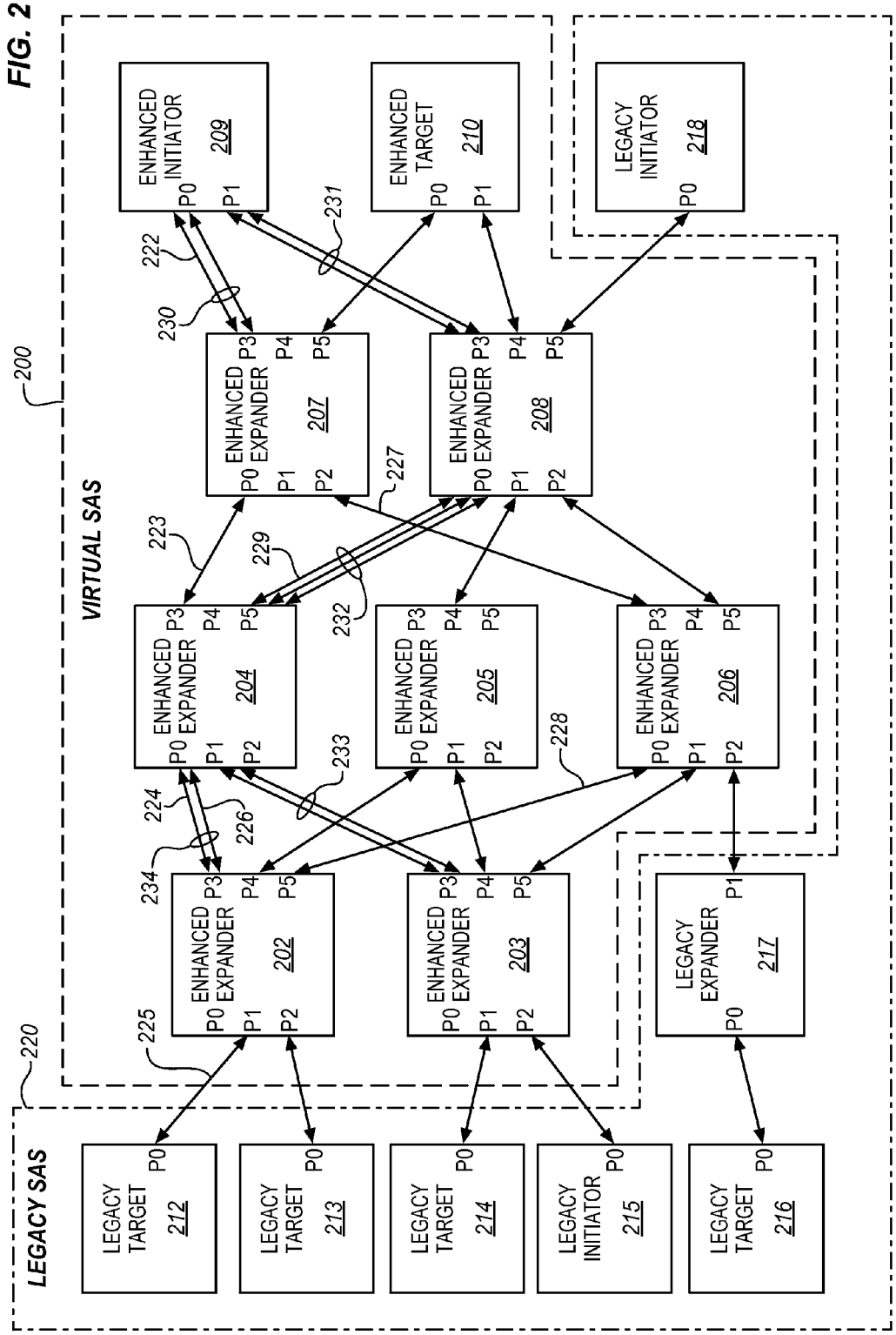
FIG. 2 is a block diagram of a plurality of exemplary enhanced SAS devices enabling a non-blocking SAS architecture utilizing virtual pathways in accordance with features and aspects hereof.

FIG. 2 is a block diagram of a plurality of exemplary enhanced SAS devices 202-210 enabling a non-blocking SAS architecture utilizing virtual pathways in accordance with features and aspects hereof FIG. 2 illustrates enhanced SAS devices 202-210 that support the virtual SAS cells previously discussed with respect to FIG. 1. Enhanced SAS devices 202-210 form a virtual SAS 200. FIG. 2 also illustrates legacy SAS devices 212-218 that form a legacy SAS 220. As discussed previously, the virtual SAS cells support a non-blocking SAS architecture, thus allowing enhanced SAS devices 202-210 within virtual SAS 200 to support the virtual pathways previously described with respect to FIG. 1. In particular, multiple concurrent open virtual pathways 230-234 are illustrated in FIG. 2. Two virtual pathways 230 are established between P0 (PHY 0) of enhanced initiator 209 and P3 of enhanced expander 207. Two virtual pathways 231 are established between P1 of enhanced initiator 209 and P3 of enhanced expander 208. Three virtual pathways 232 are established between P0 of enhanced expander 208 and P5 of enhanced expander 204. Two virtual pathways 233 are established between P1 of enhanced expander 204 and P3 of enhanced expander 203. Further, two virtual pathways 234 are established between P0 of enhanced expander 204 and P3 of enhanced expander 202. Although specific examples have been provided for the purposes of discussion, one skilled in the art will recognize that the specific configuration of enhanced devices 202-210 and virtual pathways 230-234 illustrated in FIG. 2 are a matter of design choice.

Routing of new connections may be established by passing virtual connection information from one enhanced SAS device to another enhanced SAS device. As connection information is passed along, virtual pathways are established on successive physical interfaces to create a complete virtual connection. A single physical interface will typically and simultaneously host multiple virtual pathways associated with multiple virtual connections. For example, to establish a connection from enhanced SAS initiator 209 to legacy target 212, three virtual pathways 222-224 are established, and one legacy SAS pathway 225 is established. Enhanced initiator 209 may encapsulate a virtual connection request within a virtual SAS cell, and forward the virtual SAS cell to enhanced expander 207. In this example, a virtual pathway 222 is formed between P0 of enhanced initiator 209 and P3 of enhanced expander 207. Enhanced expander 207 receives the virtual connection request from enhanced initiator 209, and identifies a route towards legacy target 212. Routing may be performed based on knowledge of the topology, which may have been previously determined by a traditional SAS discovery process. Further, because the virtual SAS cells used within virtual SAS 200 allows for multiple concurrent open connections, dynamic routing is possible based on load information for a particular egress PHY. For example, instead of establishing virtual pathway 223 at P0, enhanced expander 207 may use an alternate route, such as virtual pathway 227 (coupling P2 of enhanced expander 207 to P3 of enhanced expander 206). Enhanced expander 206 may then utilize virtual pathway 228 to enhanced expander 202 (coupling P0 of enhanced expander 206 with P5 of enhanced expander 202) to establish a routing path through virtual SAS 200 towards legacy target 212.

Returning to the example, routing may continue from enhanced initiator 209 to legacy target 212 as the connection request traverses both virtual SAS 200 and legacy SAS 220. Enhanced expander 204 may receive the virtual connection request at P3 from enhanced expander 207. Enhanced expander 204 may then identify a route and pass the virtual connection request along virtual pathway 224 to enhanced expander 202. In this example, the remaining enhanced expander to process the virtual connection request for legacy target 212 is enhanced expander 202. Enhanced expander 202 determines that legacy target 212 is coupled with P1, and creates and forwards a legacy SAS connection request to legacy target 212. If legacy target 212 accepts the connection request, then a legacy SAS connection to legacy target 212 is established over pathway 225 between legacy target 212 and enhanced expander 202.

As discussed previously, SAS communications that flow from one enhanced device to another enhanced device do so within virtual SAS cells. At the boundary between virtual SAS 200 and legacy SAS 220, SAS communications are converted between virtual SAS cells and legacy SAS frame based communication. One example of this boundary is between enhanced expander 202 and legacy target 212. Thus, while virtual SAS cells are utilized to transfer the SAS communication from enhanced initiator 209 to enhanced expander 202, the legacy SAS is used at the boundary between virtual SAS 200 and legacy SAS 220. Thus, enhanced expander 202 may perform this conversion as the SAS communication enters the legacy SAS at P1.

Multiple virtual connections may traverse a single physical interface between enhanced SAS devices 202-210. This is illustrated for P3 of enhanced expander 204 as virtual pathway 224 and virtual pathway 226, both of which traverse P0 of enhanced expander 204. In the example connection request, enhanced initiator 209 may communicate with legacy target 212 after virtual pathways 222-224, and legacy pathway 225 is established. However, expander 204 may be tasked with coordinating multiple virtual pathways that are traversing a single PHY. For example, P0 of enhanced expander 204 illustrates both virtual pathway 224 and virtual pathway 226. Virtual pathway 224 corresponds with virtual pathway 223 at P3 of enhanced expander 204. Likewise, virtual pathway 226 corresponds with virtual pathway 229 at P5 of enhanced expander 204. To sort out how the internal routing is performed within enhanced expander 204, virtual pathway information may be associated with particular PHYs of an enhanced expander. For instance, virtual SAS cells associated with virtual pathway 223 at P3 may have different routing information than virtual SAS cells associated with virtual pathway 229 at P5. Thus, enhanced expander 204, when receiving virtual SAS cells for both virtual pathway 224 and 226 at a single P0, processes each received virtual SAS cell to determine its routing information and its corresponding egress PHY. In other words, for each virtual SAS cell received on each ingress PHY, a virtual routing determination is made to determine the egress PHY based on the virtual routing information in the expander and based on the virtual pathway information associated with each received virtual SAS cell. In some embodiments, the virtual pathway information is referred to as a Virtual Connection Identifier (VCI). In the example, virtual SAS cells for virtual pathway 224 are routed to egress P3, corresponding to virtual pathway 223. Likewise, virtual SAS cells for virtual pathway 226 are routed to egress P5, corresponding to virtual pathway 229. However, due to the bi-directional nature of the virtual pathways, and SAS in general, one skilled in the art will recognize that P3 and P5 may also perform the role of ingress PHYs and P0 may perform the role of an egress PHY for communication in the opposite direction. In cases whereby an enhanced expander routes a virtual SAS cell from its ingress PHY to an appropriate egress PHY internally utilizing a cross-bar configuration between PHYs, the cross-bar configuration may be re-configured on a per-cell basis, a per time basis, etc., to connect multiple PHYs each to a single PHY temporarily.

Figure 3:
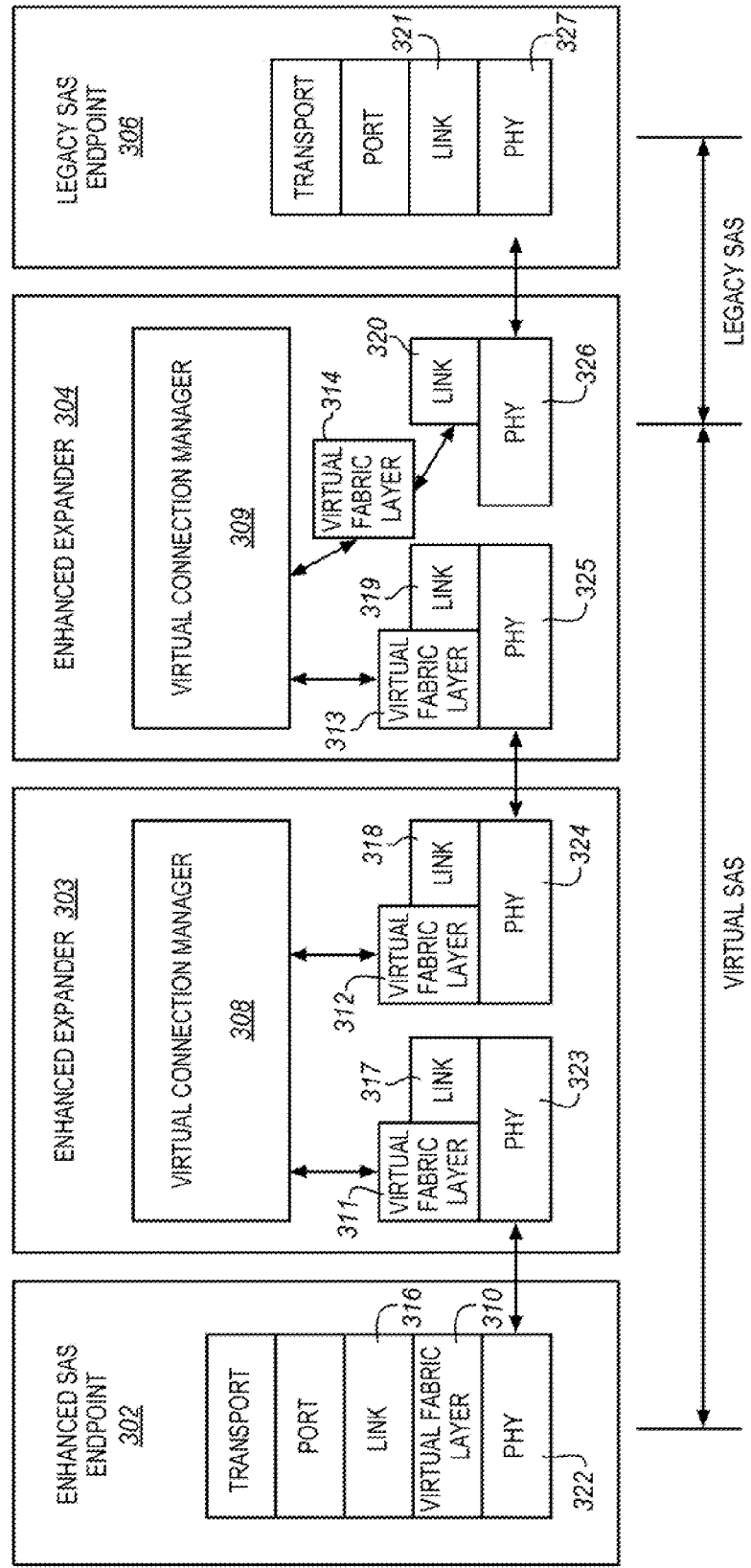
FIG. 3 is a block diagram of exemplary enhanced SAS devices implementing a non-blocking SAS architecture utilizing virtual pathways in accordance with features and aspects hereof.

FIG. 3 is a block diagram of exemplary enhanced SAS devices 302-304 enabling a non-blocking SAS architecture utilizing virtual pathways in accordance with features and aspects hereof. In this embodiment, enhanced SAS device 302 is an enhanced SAS endpoint, and enhanced SAS devices 303-304 are enhanced SAS expanders. Enhanced SAS endpoint 302 includes a virtual fabric layer 310 that couples a link layer 316 to a PHY layer 322 to convert between virtual SAS cells and legacy SAS. Enhanced SAS expander 303 includes a virtual fabric layer 311 that couples a virtual connection manager 308 with a PHY 323. Enhanced SAS expander 303 also includes a virtual fabric layer 312 that couples virtual connection manager 308 with PHY layer 324. For enhanced expander 303, virtual fabric layers 311-312 enable virtual control and routing of virtual SAS cells within the virtual SAS topology. Enhanced SAS expander 304 includes a virtual fabric layer 313 that couples virtual connection manager 309 with PHY layer 325. Virtual fabric layer 313 also enables virtual control and routing of virtual SAS cells, much like virtual fabric layers 311-312. Enhanced expander 304 also includes a virtual fabric layer 314 that couples virtual connection manager 308 with a link layer 320. Virtual fabric layer 314 converts between virtual SAS cells and legacy SAS, similar to virtual fabric layer 310. Legacy SAS endpoint 306 includes a link layer 321 coupled with a PHY layer 327.

Within the virtual SAS topology, enhanced SAS devices 302-304 transport SAS communications within virtual SAS cells. Thus, a conversion may not be performed until a boundary is reached between the virtual SAS and the legacy SAS portions of the topology. For example, virtual SAS cells may be converted to/from the legacy SAS protocol within virtual fabric layer 314 of enhanced expander 304. This allows legacy SAS protocols to be utilized with legacy SAS endpoint 306. Likewise, a conversion between virtual SAS cells and the legacy SAS protocol may not be performed until an enhanced endpoint device is reached, such as enhanced SAS endpoint 302. In this case, virtual fabric layer 310 converts SAS communications between the virtual SAS cells and the legacy SAS protocol as the information flows between PHY layer 322 and link layer 316 of enhanced endpoint 302. This is one embodiment for conversion of virtual SAS cells to legacy SAS in an enhanced SAS endpoint; other embodiments may allow virtual SAS cells to transit the protocol stack as Link, Port, or Transport.

When multiple virtual connections are established at a boundary to the legacy SAS topology, then an enhanced expander may implement an arbitration process between the multiple virtual connections and legacy SAS devices as only one active connection at a time is possible with legacy SAS. For instance, if multiple initiators are communicating with legacy SAS endpoint 306, then enhanced expander 304 may temporarily create a legacy SAS pathway to legacy SAS endpoint 306 for one virtual connection, transport data for that connection to legacy SAS endpoint 306, close the pathway, and then temporarily create another legacy SAS pathway for another virtual connection. This allows multiple virtual connections to appear as though they are communicating with a legacy SAS device, even though the legacy SAS device only supports one legacy SAS connection.

Cell-Based Flow Control

As discussed above, virtual SAS cells are exchanged within enhanced components of the virtual SAS topology. Cells (as discussed further below) wrap SAS communications within a data structure that provides for the virtual SAS operation (i.e., provides information identifying which end-to-end virtual connection a cell is associated with). Each virtual SAS cell may wrap the entirety of a SAS communication (e.g., may contain an entire frame or primitive). Since multiple virtual pathways may share a single link, it may be preferable to break up larger SAS communications (i.e., frames) into smaller portions or segment and thus generate multiple virtual SAS cells. This may provide better capability to equitably share the bandwidth of the single shared physical link for the multiple virtual pathways that share the single physical link. In other words, portions/segments of larger SAS communications may be mixed over the shared physical link to allow each virtual connection to make some progress in its desired communications.

In the legacy SAS protocol, flow control is managed on an end-to end basis controlling the number of SAS frames that may be exchanged between the connected end points. However, due to the non-blocking nature of the virtual SAS cells, flow control may be handled on a per-link basis to control the number of cells that may be exchanged over a single physical link that may be shared by multiple virtual pathways. Returning now to FIG. 1, in some embodiments, enhanced SAS expander 102 (see FIG. 1) may include a cell flow control module 118, including a data cell control module 120 and an address cell control module 122. Cell flow control module 118 manages the flow of virtual SAS cells for enhanced SAS devices. For instance, cell flow control module 118 may manage the flow of virtual SAS cells between PHY 111 and enhanced SAS endpoint 117 based on a number of cell buffers that are available for exchanging the virtual SAS cells. Cell memory 124 is used to store and forward virtual SAS cells as they transit through expander 102 and, where the virtual SAS cells will egress to a legacy SAS device, to re-assemble the virtual SAS cells that contain segments of a SAS communication into the structure of a legacy SAS frame or primitive. The total capacity of cell memory 124 may be divided among the various PHYs of expander 102. For example, if PHY 111 has some portion of a cell memory 124 dedicated to store the exchange of information with enhanced SAS endpoint 117, then cell flow control module 118 may allow virtual SAS cells to flow into and out of the portion of cell memory 124 available for PHY 111 depending of the number of virtual SAS cells that may be stored in that portion for PHY 111. Further, enhanced SAS endpoints also have a virtual SAS cell buffer. Thus, virtual SAS cells that flow between PHY 111 and enhanced SAS endpoint 117 flow depending on the capability of a similar cell memory within enhanced SAS endpoint 117 to receive virtual SAS cells from PHY 111 and/or to transmit virtual SAS cells to PHY 111.

Typical legacy SAS expanders have little need for buffering SAS communications because they do not operate as store-and-forward devices. Rather, legacy SAS expanders configure a crossbar to establish a route, and then generally become idle pass-through devices for SAS frames and primitives as data is routed towards a destination. However, due to the routable nature of virtual SAS cells, enhanced SAS expander 102 utilizes cell buffers to allow for virtual connection processing for each incoming virtual SAS cell. Such processing may include virtual routing, re-assembly of virtual SAS cells into SAS communications at a boundary to a legacy SAS link, re-ordering of virtual SAS cells, etc.

Recalling that virtual SAS cells wrap SAS communications, each virtual SAS cell may comprise a portion of a SAS frame or a portion of a SAS primitive. Some frames and primitives are associated with addressing functions in SAS to establish and tear down a connection. For example, an Open Address Frame (OAF) is used to request establishment of a connection while data frames transmit information over a previously established connection. In the virtual protocol, it may be beneficial to segment virtual SAS cells into different classes because data based virtual SAS cells and address based virtual SAS cells may have different flow control mechanisms in some embodiments. Data based virtual SAS cells (also referred to herein as virtual data cells) are virtual SAS cells that transport data and associated protocol within a connection. Address based virtual SAS cells (also referred to herein as virtual address cells) are virtual SAS cells that correspond with virtual connection requests, such as the SAS Open Address Frames that may be used to request the establishment of new connections between endpoints. Thus, in some embodiments, cell based flow control between virtual SAS devices may use a first flow control cell count for virtual data cells and a different flow control cell count for virtual address cells. This allows for new virtual connection requests (i.e., virtual address cells) to be processed (subject to the flow control for virtual address cells) despite potential stalls in the flow control for virtual data cells. Likewise, this would allow virtual data cells to flow even if resources are busy processing connection requests and as such, there is a stall in flow control for virtual address cells.

The cell memory associated with a PHY may be allocated with a first portion dedicated to virtual address cell exchanges and its associated flow control and a second portion allocated to virtual data cell exchanges and its associated flow control. The allocation for each purpose may be statically configured based on a typical profile of virtual data cell flow and that of virtual address cell flow for establishment of new virtual pathways. Some trade-offs exist between the number of concurrent virtual pathways, the utilization of the physical link, and the ability to form new virtual pathways across the link. When the same physical link typically hosts a large number of virtual pathways that transport a small total amount of data, then it may be beneficial to allow a higher number of new connections. Thus, a larger portion of a PHY's cell memory may be allocated to flow of virtual address cells as compared to that for virtual data cell flow. When the same physical link typically hosts a small number of virtual pathways that transport a large total amount of data, then it may be beneficial to allow a fewer number of new connections. Thus, a larger portion of a PHY's cell memory may be allocated to flow of virtual data cells as compared to that for virtual address cell flow. Depending on these factors, cell flow control module 118 may dynamically adjust a relationship between the number of cell buffers in a PHY's cell memory portion assigned for virtual data cells and the number of cell buffers assigned for virtual address cells.

Cell Ordering—Re-Assembly and Dynamic Virtual Routing

Since multiple virtual pathways may share a physical link, Virtual SAS cells associated with different virtual pathways (each identified by a corresponding VCI) may be received in an enhanced device in any order. In other words, virtual SAS cells for multiple virtual pathways may be mixed as they transit over a shared physical link. Thus, out-of-order receipt and delivery of virtual SAS cells may occur across one or more virtual pathways within the virtual SAS. Where such received virtual SAS cells are merely transiting through an enhanced expander, the order of the cells with respect to each virtual pathway is irrelevant and the received cells are simply routed to an egress PHY of the expander for the next leg of their journey. However, where an expander is converting virtual communications to legacy SAS communications for application to a legacy SAS device, multiple cells for a SAS communication are stored to aggregate them back into a re-assembled legacy SAS communication. Or, for example, where an enhanced end device receives a mixture of virtual SAS cells each associated with different virtual pathways, the enhanced end device converts and re-assembles the virtual SAS cells into legacy SAS communications for further processing within its link layer element and higher layer SAS processing elements. Thus, virtual SAS may perform activities to re-order SAS communications prior to assembling virtual SAS cells back into legacy SAS protocols. To permit ordered re-assembly of legacy SAS communications from virtual SAS cells received in any order, each cell may identify where it belongs in the re-assembled SAS communication.

Since each virtual SAS cell may specify its position for its portion in the underlying SAS communication for conversion to a legacy SAS communication, multiple virtual SAS cells each associated with a portion of single legacy SAS communication may be delivered through the virtual SAS topology on any virtual pathway. The virtual pathway (virtual route) for each virtual SAS cell of a SAS communication could be altered dynamically. In other words, not only may a preferred virtual route be selected at the time of establishing a virtual connection between endpoints, but for each virtual SAS cell destined to transit a virtual connection, a different virtual route could be employed. The virtual route for an established virtual connection could be altered to adjust for load balancing, to adjust for an un-responsive (e.g., failed) leg of the previously established virtual route, etc. Such dynamic, cell by cell virtual route selection may add overhead processing within each enhanced SAS device but may provide the benefit of dynamic re-routing of virtual SAS cells for a virtual connection. Thus, out-of-order delivery may also allow for different fragments of a single SAS communication to be routed differently through the virtual SAS, thus improving the performance of the virtual SAS.

As discussed previously, it is difficult in the legacy SAS domain to ensure a predictable level of performance across all legacy SAS endpoints in large topologies due to the blocking nature of open SAS connections. This may result in unpredictable and/or chronically poor performance for certain endpoint devices in the topology. However, the use of virtual SAS cells to encapsulate legacy SAS communications allows for multiple concurrent connections, enhanced flow control on a per-link basis instead of an end-to-end basis, and improves the performance of the typical SAS domain by increasing the utilization of physical link resources through statistical multiplexing while also providing a deterministic bandwidth for each virtual connection between endpoints. Further, when SAS communications are segmented into a plurality of virtual SAS cells, additional routing efficiencies may exist that arise from segmenting larger SAS communications into a plurality of smaller, more easily processed, cells.

EXAMPLES

Figure 4:
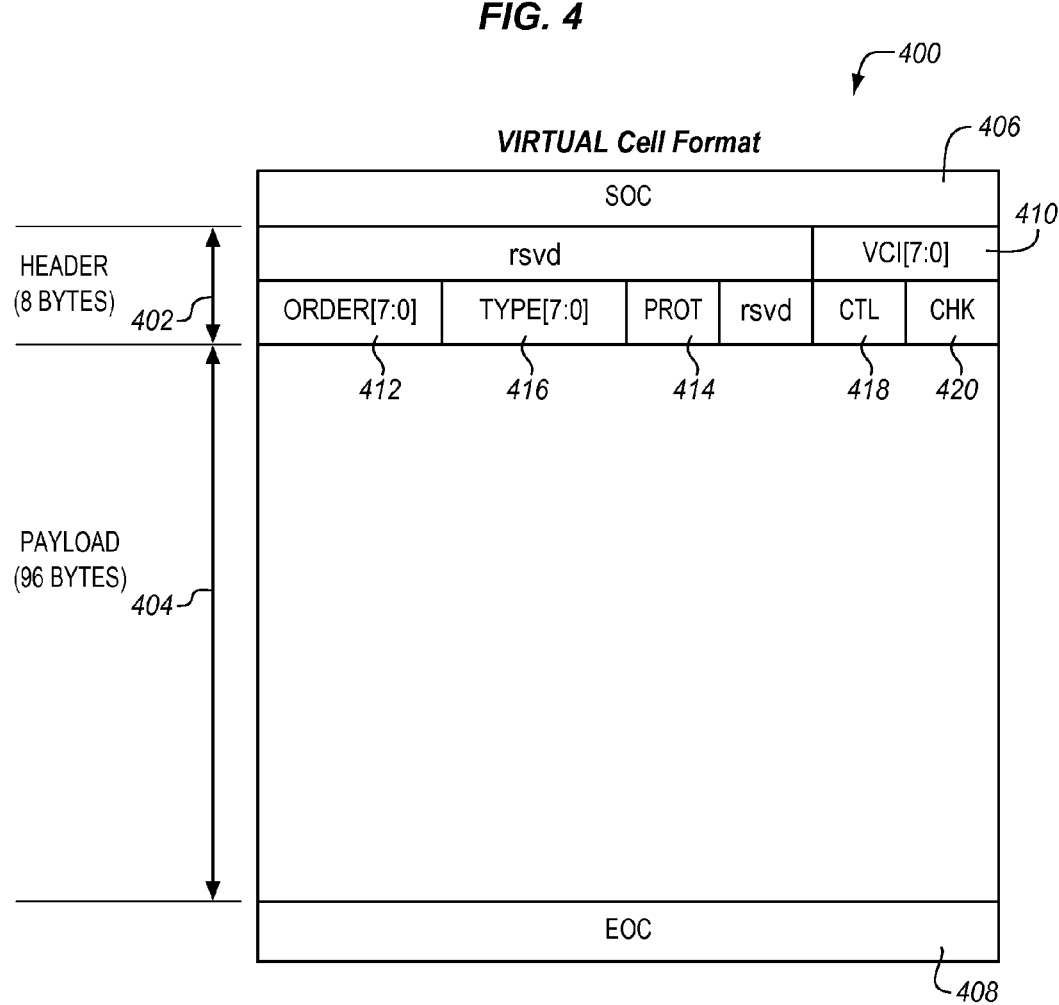
FIG. 4 illustrates an exemplary format for a virtual SAS cell in accordance with features and aspects hereof.

FIGS. 4-9 present exemplary data structures and an example virtual SAS architecture in an exemplary embodiment. In particular, FIGS. 4-8 correspond to the data structures and FIG. 9 corresponds to the virtual SAS architecture. Referring to FIG. 4, this figure illustrates an exemplary format for a virtual SAS cell 400 in accordance with features and aspects hereof. Cell 400 is composed of a header 402 and a payload 404 surrounded by Start Of Cell (SOC) 406 and End Of Cell (EOC) 408 primitives. Header 402 indicates the route to follow through a virtual connection fabric, a sequence number of cell 400 to support reassembly into larger SAS frames, and an indication of the protocol and frame type being emulated by cell 400. Header 402 may include some nominal protection to prevent misrouting of cells, but no CRC or other check may be necessary on payload 404 in this embodiment as this level of protection is left to the higher level SAS link functions of legacy SAS (e.g., the CRC protection of a legacy frame).

A Virtual Connect Identifier (VCI) field 410 provides a link-by-link association of cell 400 with a particular connection within a virtual connection fabric. VCI 410 eliminates the need to consume a full 8 bytes of SAS address in every cell header, and enables alternate routes through a virtual SAS. Although this particular embodiment discusses route determination at the establishment of the virtual connection, dynamic routes in some embodiments may be supported. In a dynamic route, the route may change during the open virtual connection on an as-needed basis and on a cell by cell basis (as discussed above).

VCIs for a virtual connection may change on each successive link that cell 400 traverses, but may be identical for both directions of a particular virtual connection on a particular link. In this embodiment, VCI 0x0 is utilized for internal expander handling of legacy SAS connection, VCI 0x1 is utilized for inter-expander communication, including passing of link credit information, and VCI 0x2 and above are utilized for establishing virtual pathways and transmitting cells associated with the various virtual pathways which may be simultaneously present on a particular link. Table 1 describes the utilization of the VCI field 410 of cell 400 in an exemplary embodiment.

TABLE 1

| VCI | Usage |
|---|---|
| 0x00 | Reserved (utilized for internal expander handling of legacy devices) |
| 0x01 | Inter-expander communication (e.g. ADDRESS_IDENTIFY, cell credit, and also any health and status of attached expander |
| 0x02-0xFF | Routed cell traffic (connection cells as well as address cells) |

An ORDER field 412 is used to assemble multiple cells back into the original SAS frame at the boundary between virtual SAS and legacy SAS. The ORDER[6:0] bits allows up to 128 separate cells to be reassembled back into a frame. The ORDER[7] bit is used to specify that a cell is the last cell that makes up the frame. Cells may be sent in order, and in the event that a cell is missing, the frame may be forwarded on to the legacy SAS recipient so that the higher layer SAS protocol may manage the error.

A PROT field 414 describes the protocol being handled by cell 400 (SSP, SMP, STP), if cell 400 being used to establish a connection request (ADDRESS), or if cell 400 is transporting a SAS primitive sequence (PRIMITIVE). A TYPE field 416 describes what kind of frame is being represented by the cell and is specific to the protocol described by PROT field 414. Exemplary combinations of PROT 414 and TYPE 416 are given in the following table 2 along with details on how many cells are utilized to transport the frame type given a 96-byte payload for this particular embodiment.

TABLE 2

| PROT | TYPE | Frame Type | Frame Size with Header, IU, CRC (Bytes) | Cell Payloads Used (96 byte payload) |
|---|---|---|---|---|
| | | SMP: | | |
| 0x00 | 0x40 | SMP_REQUEST (Max length) | 1028 | 10.708 |
| 0x00 | 0x41 | SMP_RESPONSE (Max length) | 1028 | 10.708 |
| | | SSP: | | |
| 0x1 | 0x01 | SSP_DATA (Max length) | 1052 | 10.958 |
| 0x1 | 0x05 | SSP_XFER_RDY | 40 | 0.417 |
| 0x1 | 0x06 | SSP_COMMAND (32 byte CDB) | 72 | 0.750 |
| 0x1 | 0x06 | SSP_COMMAND (280 byte CDB) | 308 | 3.208 |
| 0x1 | 0x07 | SSP_RESPONSE (No Sense Data) | 52 | 0.542 |
| 0x1 | 0x07 | SSP_RESPONSE (Max length) | 1052 | 10.958 |
| 0x1 | 0x07 | SSP_TASK | 56 | 0.580 |
| | | STP: | | |
| 0x2 | 0x27 | STP_REG_HOST_TO_DEV | 24 | 0.250 |
| 0x2 | 0x34 | STP_REG_DEV_TO_HOST | 24 | 0.250 |
| 0x2 | 0x39 | STP_DMA_ACTIVATE | 8 | 0.083 |
| 0x2 | 0x41 | STP_DMA_SETUP | 32 | 0.333 |
| 0x2 | 0x46 | STP_DATA | 8200 | 85.417 |
| 0x2 | 0x58 | STP_BIST_ACTIVATE | 16 | 0.167 |
| 0x2 | 0x5F | STP_PIO_SETUP | 24 | 0.250 |
| 0x2 | 0xA1 | STP_SET_DEVICE_BITS | 12 | 0.125 |
| | | Address: | | |
| 0x8 | 0x50 | ADDRESS_IDENTIFY | 96 | 1.000 |
| 0x8 | 0x51 | ADDRESS_REQUEST | 96 | 1.000 |
| 0x8 | 0x52 | ADDRESS_ACK_ACCEPT | 96 | 1.000 |
| 0x8 | 0x53 | ADDRESS_ACK_REJECT | 96 | 1.000 |
| 0x8 | 0x54 | ADDRESS_CLOSE | 96 | 1.000 |
| 0x8 | 0x55 | ADDRESS_BREAK | 96 | 1.000 |
| | | Primitive: | | |
| 0x9 | 0x61 | PRIMITIVE_SMPSSP | 96 | 1.000 |
| 0x9 | 0x62 | PRIMITIVE_STP | 96 | 1.000 |
| 0x9 | 0x63 | PRIMITIVE_NOPROT | 96 | 1.000 |
| | | Credit: | | |
| 0xA | 0x71 | CREDIT_CONN | 96 | 1.000 |
| 0xA | 0x72 | CREDIT_ADDR | 96 | 1.000 |

The ADDRESS and PRIMITIVE cell types utilize a fraction of payload 404, but redundancy is placed within cell 400 to maximize resilience to bit errors. If a frame or primitive does not completely fill payload 404, then the unused portion of payload 404 may be padded, ensuring that payload 404 is 96 bytes in support of simplified buffer management in this embodiment. A protocol variant in an exemplary embodiment allows less than a 96 byte payload to be transmitted by sending an End of Cell 408 primitive early to increase the efficiency of bandwidth utilization, but this smaller cell may still consume its full size in a buffer; this allows more efficient utilization of link bandwidth without sacrificing a simplified buffer management architecture.

A CTL field 418 provides control capabilities for cell 400. The CTL[3] bit supports defining the position of the CRC in the last cell of a variable length frame. The CTL[2:0] bits are reserved. On the last cell, there may be a need to specify the offset of the link layer CRC in the final payload since that can be in various positions depending upon the frame type and length. When the CTL[3] bit is asserted in the last cell of the frame, it means that the last DWORD of payload 404 includes the offset in DWORDs to the CRC in payload 404. And, if the CTL[3] bit is not asserted in the last cell of the frame, then the CRC itself is in the last DWORD of the payload in this embodiment. The CTL[3] bit in this embodiment is only allowed to be asserted if the ORDER[7] bit is asserted.

The CHK[3:0] bits ensures the integrity of header 402 so as to avoid misrouting of cell 400 in the event of a bit error corrupting header 402. A short cyclic redundancy calculation provides a sufficient error handling capability (e.g. CRC-4 from ITU G.704). In the event that cell 400 is received with an invalid CHK field 420, it may be discarded since the association of a cell with a particular virtual connection is not valid without a valid header 402.

Unlike a typical SAS destination address, VCIs may be different with every successive virtual pathway in a virtual connection in this embodiment, allowing each expander to use the combination of a VCI and the ingress PHY number to associate a cell with a particular connection and perform the appropriate routing to an egress PHY. Expanders in accordance with features and aspects hereof translate VCIs of ingress cells to an appropriate value for the next link prior to the cells being sent to an egress PHY. Assignment of the set of VCIs used for a connection may take place during connection establishment, and the VCIs may be assigned to each outbound link and each inbound link by the appropriate device which is propagating the ADDRESS_REQUEST and ADDRESS_ACKNOWLEDGE virtual SAS cells, respectively.

A standard SAS Open Address Frame (OAF) is encapsulated within an ADDRESS_REQUEST virtual SAS cell from the endpoint requestor through the virtual SAS topology. Expanders examine an incoming ADDRESS_REQUEST virtual SAS cell and determine the best pathway for establishing a new virtual connection based on the current operational state of the expander. The operational state may include such parameters as candidate pathways, existing connection profiles, expected bandwidth of open connections, protocol, and current queue levels, for example. However, in order to simplify a virtual SAS topology, a re-use of legacy SAS discovery and routing tables may be used in some embodiments. In a variant of the connection establishment protocol, the expander may modify the allowed bandwidth parameter in the ADDRESS_REQUEST cell if the operational state suggests if there is a risk of a link being over utilized. Prior to propagating the ADDRESS_REQUEST virtual SAS cell along its chosen path, an expander will change the connection status from Idle to Pending Open in its internal VCI table (described later), indicating that the particular VCI is reserved, pending the outcome of the connection request at the destination. Next, the VCI is translated to an available identifier on the egress PHY and the ADDRESS_REQUEST is forwarded on to the next expander. This process continues on until the destination is reached; in the case of a virtual connect capable end device, or a legacy SAS link is reached, in which case the ADDRESS_REQUEST cell is converted to a legacy SAS Open Address Frame.

Assuming the destination responds with a legacy SAS OPEN_ACCEPT, an ADDRESS_ACK_ACCEPT cell traverses the route in reverse back to the source of the open request, utilizing the same set of virtual pathways and associated VCIs which were activated when the ADDRESS_REQUEST cell was propagated in the forward direction. As the ADDRESS_ACK_ACCEPT passes through each enhanced expander, the enhanced expander changes the connection status from Pending Open to Connected, indicating that virtual data cells are allowed to flow across the virtual connection. In the variant where the allowed bandwidth is reduced in the downstream ADDRESS_REQUEST cell, the upstream ADDRESS_ACK_ACCEPT cell will include a final negotiated rate which the two SAS endpoints will use to shape their egress traffic, allowing determinism in the subscribed bandwidth of the fabric.

If the destination instead responds with an OPEN_REJECT, a ADDRESS_ACK_REJECT cell will instead traverse the route in reverse, but with the corresponding OPEN_REJECT indication. As such, the expander changes the connection status from Pending to Idle, indicating that there is no longer any pending connection activity for this particular VCI. This indication is also used to de-allocate resources, which may include buffer space, subscribed bandwidth, and the VCI itself, thus allowing other connection requests to use these resources.

For the general case of crossing ADDRESS_REQUEST cells, there is no need to perform any arbitration or pathway resolution within the virtual SAS topology. Instead, these cells will just pass each other on their way to their respective end points. There are three cases of interest. (1) For different source/destination pairs the crossing ADDRESS_REQUEST cells are just forwarded in each direction. (2) For the same source/destination pairs, the crossing ADDRESS_REQUEST cells are resolved at the endpoints using legacy SAS arbitration rules; and (3) Regardless of the source/destination pairs, if the crossing ADDRESS_REQUEST cells happen to have the same VCI, the Enhanced Expander with the larger World Wide Name (WWN) may send an ADDRESS_ACK_REJECT cell with a VC_REJECT (VCI CONFLICT) indication, instructing the expander with the lower WWN to use a different VCI and retry the open request.

Figure 5:
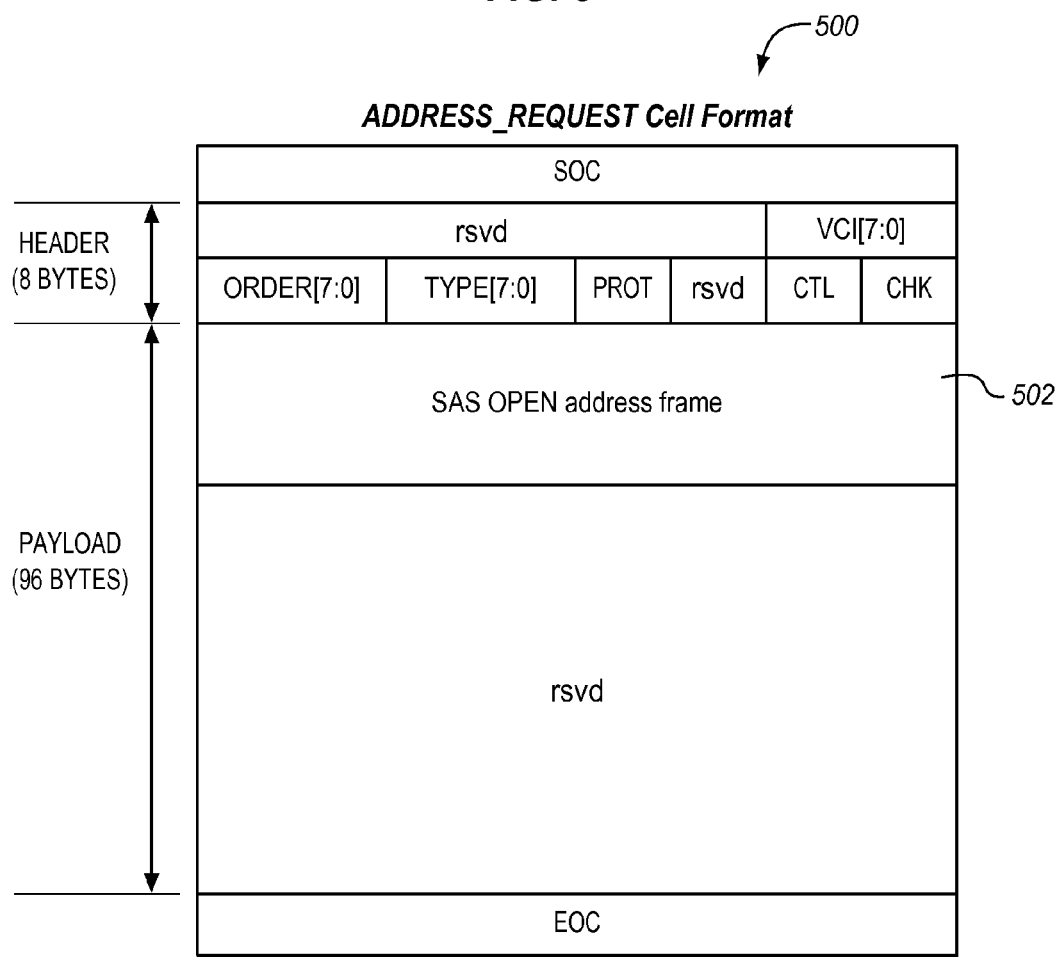
FIG. 5 illustrates an exemplary format for an ADDRESS_REQUEST virtual SAS cell in accordance with features and aspects hereof.

FIG. 5 illustrates an exemplary format for an ADDRESS_REQUEST virtual SAS cell 500 in accordance with features and aspects hereof.

Figure 6:
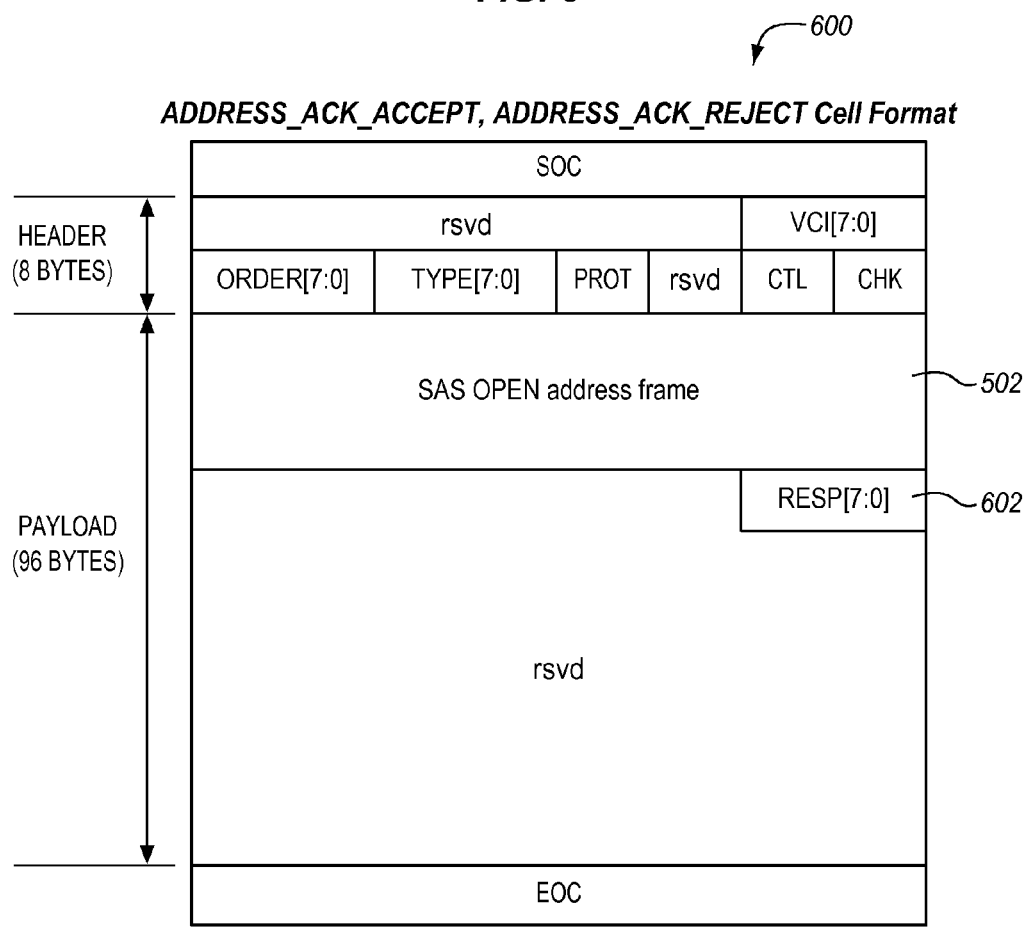
FIG. 6 illustrates an exemplary format for an ADDRESS_ACK_ACCEPT and an ADDRESS_ACK_REJECT virtual SAS cell in accordance with features and aspects hereof.

ADDRESS_REQUEST virtual SAS cell 500 encapsulates a legacy SAS OPEN address frame 502 which is used by expanders to look up the destination WWN and determine the best route for the requested connection as it propagates from source to destination. FIG. 6 illustrates an exemplary format for an ADDRESS_ACK_ACCEPT and an ADDRESS_ACK_REJECT virtual SAS cell 600 in accordance with features and aspects hereof. The ADDRESS_ACK_ACCEPT or ADDRESS_ACK_REJECT virtual SAS cell 600 also includes the original, unaltered SAS OPEN address frame 502 as well as a RESP field 602 to provide the response indication from the destination: OPEN_ACCEPT or one of the various types of OPEN_REJECT.

RESP field 602 provides exemplary response indications per the following:

```
0x00 = reserved,
0x01 = OPEN_ACCEPT,
0x10 = OPEN_REJECT (BAD DESTINATION)
0x11 = OPEN_REJECT (CONNECTION RATE NOT SUPPORTED),
0x12 = OPEN_REJECT (NO DESTINATION),
0x13 = OPEN_REJECT (PATHWAY BLOCKED),
0x14 = OPEN_REJECT (PROTOCOL NOT SUPPORTED),
0x15 = OPEN_REJECT (RESERVED ABANDON 1),
0x16 = OPEN_REJECT (RESERVED ABANDON 2),
0x17 = OPEN_REJECT (RESERVED ABANDON 3),
0x18 = OPEN_REJECT (RESERVED CONTINUE 0),
0x19 = OPEN_REJECT (RESERVED CONTINUE 1),
0x1A = OPEN_REJECT (RESERVED INITIALIZE 0),
0x1B = OPEN_REJECT (RESERVED INITIALIZE 1),
0x1C = OPEN_REJECT (RESERVED STOP 0),
```

-continued

```
0x1D = OPEN_REJECT (RESERVED STOP 1),
0x1E = OPEN_REJECT (RETRY),
0x1F = OPEN_REJECT (STP RESOURCES BUSY),
0x20 = OPEN_REJECT (WRONG DESTINATION),
0x21 = OPEN_REJECT (ZONE VIOLATION),
0x30 = VC_REJECT (VIRTUAL RESOURCES BUSY), or
0x31 = VC_REJECT (VCI CONFLICT).
```

The OPEN_REJECT response indications (0x00-0x21) map to existing SAS behaviors, while the VC_REJECT indications (0x30-0x31) are specific to virtual pathways. The VC_REJECT (VIRTUAL RESOURCES BUSY) and VC_REJECT (VCI CONFLICT) indications are sourced by enhanced expanders rather than the destination. The VC_REJECT (VIRTUAL RESOURCES BUSY) indication is given if an enhanced expander identifies that too many virtual pathways are already routed through it so the upstream expander should attempt another route, if available, or provide an OPEN_REJECT (RETRY) indication back to the source. The VC_REJECT (VCI CONFLICT) is an indication to the upstream expander's link that it has attempted to use a VCI already in use on the interconnecting link; the upstream expander typically retries the connection using a VCI which is not currently allocated. Note that this is a normal behavior which will occur whenever there are crossing ADDRESS_REQUEST cells which happen to have the same VCI. The expander with the larger WWN gets priority and as such is allowed to send the VC_REJECT (VCI CONFLICT).

Figure 7:
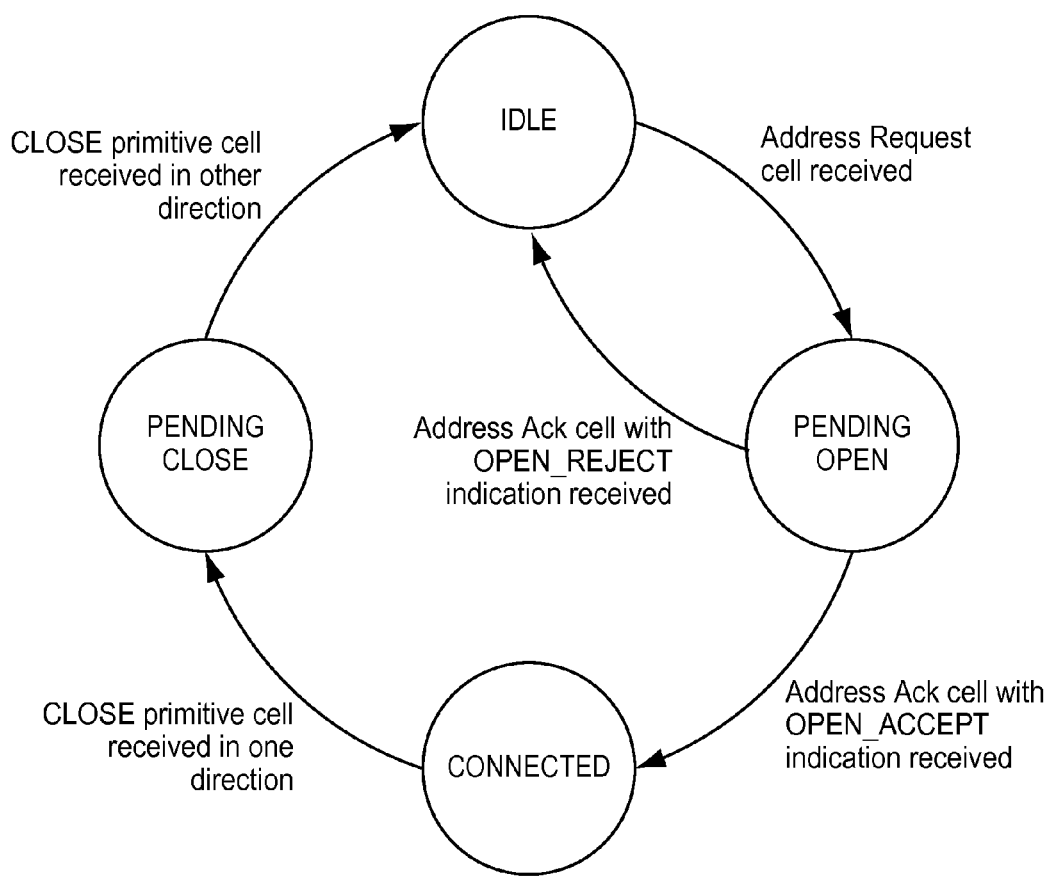
FIG. 7 illustrates an exemplary VCI connection state diagram in accordance with features and aspects hereof.

Once a connection has completed, legacy SAS will propagate CLOSE primitive cells in either direction across the pathways of the connection. The legacy SAS CLOSE primitive is encapsulated in a virtual SAS cell within a virtual connection fabric. The receipt of the first CLOSE primitive at an expander instructs the expander to change the connection status from Connected to Pending Close in a VCI table, discussed later. FIG. 7 illustrates an exemplary VCI connection state diagram in accordance with features and aspects hereof. This same state machine is operable for each virtual connection request of each PHY. Upon receipt of the CLOSE in the opposite direction of a virtual connection, the state goes from Pending Close to Idle, thus indicating the VCI and any other resources associated with the connection may be reused.

A VCI table is implemented in this embodiment within each PHY in expanders to track the route and connection state for the multiple open connections which may be simultaneously present. The VCI table includes information needed to switch an ingress cell associated with an established virtual connection to the appropriate egress PHY and then translate the ingress VCI to the proper egress VCI for the next virtual pathway. Pointer fields are also included to manage the activation and deactivation of VCIs during operation via a double-linked list to allow extracting entries from any arbitrary position within the list, as is needed when receiving an ADDRESS_REQUEST cell which already specifies the VCI to be used for a virtual connection. A head pointer points to the next available entry in the list and a tail pointer points to the last available entry in the list. A next available VCI is popped from the head of the list and, when that VCI is closed or deactivated, the VCI is pushed back (i.e., to the head or the tail of the list). When head=tail=null, no more VCI's are presently available. The entries (in addition to being linked for allocation/deallocation purposes) are in an ordered table indexed by ingress VCI number. Thus, when a virtual SAS cell is received on an established virtual connection, the ingress VCI may simply be used as an index into the table to locate the entry identifying the egress VCI, PHY, etc.

In an alternate embodiment, each VCI entry of the indexed table has a field indicating whether or not the VCI is used or free. To locate an available VCI, rather than using the double-linked list structure noted above, the indexed table is searched sequentially to locate a free VCI. If found, the free VCI entry is marked as used. When the virtual connection associated with that VCI is closed, the corresponding entry is marked free again. If no entry is presently marked free, the table search indicates that no VCI is presently available and the virtual connection request is rejected.

In both exemplary embodiments, a VCI table entry is allocated when a new virtual connection is requested and de-allocated (freed) when that virtual connection is closed. As discussed further herein, reference to "allocating" a VCI refers to either of these approaches as well as similar approaches to locate and allocate a presently unused VCI. Reference to "freeing" or "de-allocating" a VCI refers to either of these approaches as well as similar approaches to return a VCI entry to the unused or free status (adding it back to the links list or marking a field of the entry as "free" or "idle").

FIG. 8 illustrates an exemplary per-PHY VCI table in accordance with features and aspects hereof. The VCI table of FIG. 8 is indexed by ingress VCI 814 and includes the egress PHY 802, egress VCI 804, pointer next 806, pointer previous 808, priority 810, and state fields 812 as shown in FIG. 8. Note that VCI 0x0 and 0x1 are utilized for legacy and inter-expander communication, as previously described in the cell header description, so the corresponding entries are unused in the VCI table. Organization and widths of all bit fields are system implementation dependent and are shown just as an example.

Figure 9:
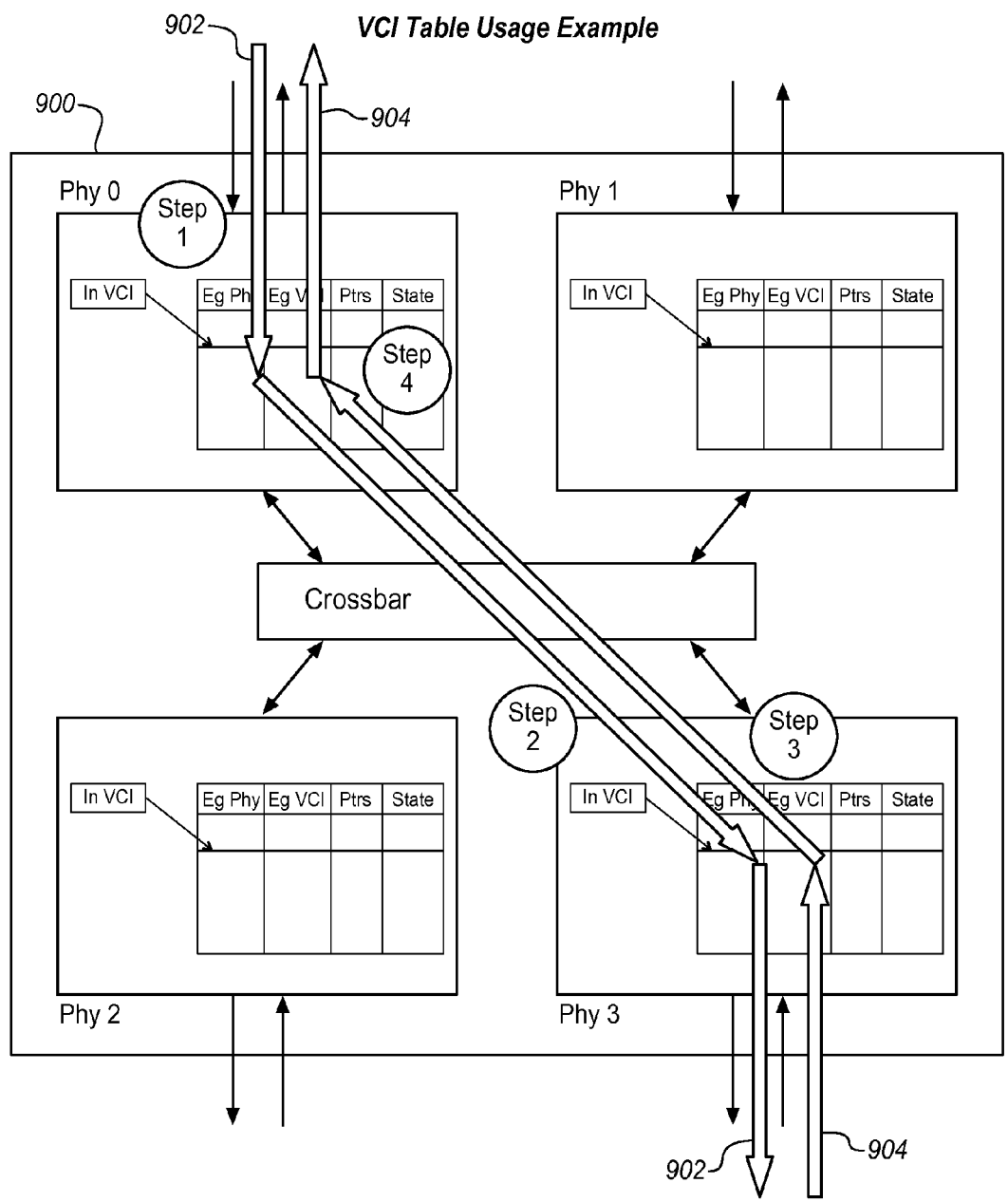
FIG. 9 is a block diagram of an exemplary expander enabling a non-blocking SAS architecture utilizing virtual pathways in accordance with features and aspects hereof.

FIG. 9 is a block diagram of an exemplary enhanced expander 900 enabling a non-blocking SAS architecture utilizing virtual pathways in accordance with features and aspects hereof. FIG. 9 shows a simplified 4-PHY expander for the purpose of demonstrating how VCI Table 800 is filled out at the time of connection establishment. In this example, a virtual connection request is received by PHY 0 and propagated to PHY 3 in the downstream direction 902 with the response subsequently returned from PHY 3 back to PHY 0 in the upstream direction 904. The step numbers reference the detailed steps provided in the subsequent discussion.

At the start of day, each PHYs set of VCI table entries are initialized with State set to Idle (e.g., "free"). As each new virtual connection is added, an available VCI is identified from the VCI table, and the state of the entry in the VCI table is transitioned from Idle to Connected (e.g., "used") per the state diagram of FIG. 7.

Exemplary Steps to establish a Virtual Connection:

Assuming a new virtual connection is to be established from PHY 0-VCI 6 to PHY 3-VCI 9, the following exemplary steps are taken:

1. PHY 0 Receives an ADDRESS_REQUEST cell from its link.
1a. PHY 0, also known as the "upstream PHY" in this example since it is the source of the connection request, recognizes an ingress ADDRESS_REQUEST cell and accesses expander routing facilities as well as operational state to determine that the appropriate "downstream" or egress PHY to be used is PHY 3.
1b. PHY 0 sets the state for VCI 6 in its VCI table to PENDING OPEN, and sets the egress PHY to PHY 3.
1c. PHY 0 allocates VCI 6 in its VCI table (e.g., by removing its entry from the list or marking a status field in the located entry).
1d. PHY 0 sets an internal expander control associated with the ADDRESS_REQUEST cell to indicate the ingress PHY number and the connection priority, as needed by PHY 3 in subsequent steps, while leaving the ingress VCI set in the ADDRESS_REQUEST cell it passes to PHY 3.
2. PHY 3 receives the ADDRESS_REQUEST cell from PHY 0.
2a. PHY 3 receives the ADDRESS_REQUEST cell from PHY 0 and allocates an available VCI from the VCI table-VCI 9 in this example.
2b. Using the chosen VCI, PHY 3 sets the state in the VCI Table for VCI 9 to PENDING OPEN and additionally fills out the given upstream PHY from the internal expander control associated with the ADDRESS_REQUEST cell and the VCI number from the VCI field in the ADDRESS_
REQUEST cell. The priority is also extracted from the internal expander control and is used to fill in the priority field within the VCI table.
2c. PHY 3 next changes the VCI in the ADDRESS_REQUEST cell to VCI 9.
2d. PHY 3 subsequently propagates the modified ADDRESS_REQUEST cell on the downstream link.
3. Subsequently an ADDRESS_ACK_ACCEPT cell or ADDRESS_ACK_REJECT cell is returned on the link to PHY 3 with a VCI of 9.
3a. The egress PHY (PHY 0), egress VCI (VCI 6), and state fields are read from the VCI table 800 entry of PHY 3 for VCI 9, and it is confirmed that VCI 9 is indeed in a PENDING OPEN state, otherwise error recovery may be necessary.
3b. If it is an ADDRESS_ACK_ACCEPT cell which is received, the state of the VCI 9 entry in VCI table 800 is changed from PENDING OPEN to CONNECTED.
3c. If it is an ADDRESS_ACK_REJECT cell which is received, the state of the VCI 9 entry in VCI table 800 is returned to IDLE, and VCI 9 is freed.
3d. PHY 3 changes the VCI field of the ADDRESS_ACK_ACCEPT or ADDRESS_ACK_REJECT cell to 6, as determined in step 3a and sets an internal expander control associated with the ADDRESS_ACK_ACCEPT cell to 9 to indicate the downstream VCI number to the upstream PHY.
3e. The crossbar is configured to link PHY 3 to PHY 0.
3f. PHY 3 sends the ADDRESS_ACK_ACCEPT or ADDRESS_ACK_REJECT cell on to PHY 0.
4. PHY 0 receives the ADDRESS_ACK_ACCEPT or ADDRESS_ACK_REJECT cell from PHY 3.
4a. Upon receiving the ADDRESS_ACK_ACCEPT or ADDRESS_ACK_REJECT cell from PHY 3, the state field is read from VCI Table 800 entry for VCI 6, and it is confirmed that VCI 6 is indeed in a PENDING OPEN state, otherwise error recovery may be necessary.
4b. If it is an ADDRESS_ACK_ACCEPT cell which is received, the chosen downstream VCI 9 is extracted from the internal expander control associated with the ADDRESS_ACK_ACCEPT cell and written back to the VCI 6 entry Egress VCI field. The state is also updated from PENDING OPEN to CONNECTED at this point.

4c. If it is an ADDRESS_ACK_REJECT cell which is received, the state of the VCI 6 entry in VCI table 800 is returned to IDLE, and the VCI table entry for VCI 6 is freed.

4e. PHY 0 subsequently propagates the translated cell on its upstream link.

At this point (assuming the connection request was accepted) the VCI Tables on both the upstream and downstream PHYs are filled out for the newly established connection and cells associated with the connection may flow.

Note that the downstream PHY manages any Reject—VCI conflicts which occur when the attached expander happens to choose the same VCI in the case of crossing ADDRESS_REQUEST cells. Also, it should be apparent from this description that ADDRESS_REQUEST cells and ADDRESS_ACK cells take priority over established connection cells to ensure that all VCI tables along the path are fully and expeditiously filled out prior to needing to handle traffic.

Exemplary Steps for Routing Cells in a Virtual Connection:

1. PHY 0 receives a cell from its link.
1a. The ingress VCI 6 is used to look up the egress PHY and egress VCI as well as the associated state and priority from VCI Table 800 entry 6. It is confirmed that VCI 6 is indeed in a CONNECTED state, otherwise error recovery may be necessary.
1b. The VCI in the cell is translated from the ingress VCI of 6 to the egress VCI of 9.
1c. The crossbar is configured to link PHY 0 to PHY 3.
1d. The translated cell is sent to the egress PHY 3 as indicated by VCI Table 800 entry.
2. PHY 3 receives the translated cell from PHY 0.
2a. PHY 3 recognizes the received cell is of a type associated with an established connection (i.e. not an Address Cell type used for opening or closing a connection) and no further action may be necessary.
2b. PHY 3 sends the cell to its link.
3. Similar steps occur when propagating cells associated with an established virtual connection in the opposite direction.

If cells within a connection encounter a VCI table entry in the IDLE state, it should be recognized as an error condition due to either a corrupt VCI or a corrupt VCI table entry, and the cell may be discarded.

Exemplary Steps for Closing a Virtual Connection:

1. PHY 0 receives an ADDRESS_CLOSE primitive cell for VCI 6 from its link.
1a. The egress PHY (PHY 3), egress VCI (VCI 9) as well as the associated state are read from VCI Table 800 entry 6. The egress information is used to send the cell on its way while the state is used for error checking. For example, a close for a connection that is not actually connected is an error.
1b. PHY 0 sets the state for VCI 6 in its VCI table to PENDING CLOSE.
1c. The VCI in the cell is translated from the ingress VCI of 6 to the egress VCI of 9.
1d. The crossbar is configured to link PHY 0 to PHY 3.
1e. The cell is sent to the egress PHY, PHY 3, as indicated by the associated VCI Table 800 entry.
2. PHY 3 receives the ADDRESS_CLOSE primitive cell from PHY 0.
2a. PHY 3 sets the state for location 9 in the VCI Table to PENDING CLOSE
2b. PHY 3 propagates the ADDRESS_CLOSE cell on its downstream link 3. Subsequently an ADDRESS_CLOSE cell for VCI 9 is returned on the link to PHY 3.
3a. The egress PHY (PHY 0), Egress VCI (VCI 6) as well as the associated state are read from VCI Table entry 9.
3b. PHY 0 sets the state for VCI 6 in its VCI table to IDLE and frees the VCI table entry for VCI 6.
3c. The VCI in the cell is translated from the Ingress VCI of 9 to the Egress VCI of 6.
3d. The crossbar is configured to link PHY 3 to PHY 0.
3e. The cell is sent to the egress PHY 0 as indicated by VCI Table 800 entry.
4. PHY 0 Receives the ADDRESS_CLOSE cell from PHY 3.
4a. PHY 0 sets the state for location 9 in the VCI Table to IDLE frees the VCI table entry for VCI 9.
4b. PHY 0 propagates the ADDRESS_CLOSE cell on the upstream link.

At this point the connection at both the upstream and downstream PHYs is completely torn down, and the associated resources may be reused for other connections.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached SCSI (SAS) expander comprising:
a first physical Link (PHY);
a second PHY; and
a Virtual Connection Manager (VCM) adapted to exchange information over a plurality of concurrently established full-duplex virtual pathways directly between the first PHY and the second PHY.

2. The SAS expander of claim 1 wherein:
the information comprises one or more virtual SAS cells, wherein each of the one or more virtual SAS cells includes a segmented SAS communication.

3. The SAS expander of claim 2 further comprising:
an Expander Link Layer (XL) coupled with the first PHY, the XL adapted to exchange SAS communications with legacy SAS devices; and
a virtual fabric layer coupled with the XL and the VCM, the virtual fabric layer adapted to receive the SAS communication from the XL, to segment the SAS communication into the one or more virtual SAS cells, and to provide the one or more virtual SAS cells to the VCM for routing to the second PHY.

4. The SAS expander of claim 2 further comprising:
a cell flow control module adapted to manage the flow of the one or more virtual SAS cells based on a number of cell buffers that are available for exchanging the one or more virtual SAS cells with a PHY of the SAS expander and an external device.

5. The SAS expander of claim 4 wherein the cell flow control module further comprises:
a data flow control module adapted to manage a flow of virtual data cells based on a number of data cell buffers of the cell buffers that are available for exchanging virtual data cells across the PHY; and an address flow control module adapted to manage a flow of virtual address cells based on a number of address cell buffers of the cell buffers that are available for exchanging virtual address cells across the PHY.

6. The SAS expander of claim 5 wherein:
a ratio between a number of address cell buffers and a number of data cell buffers changes dynamically based on a bandwidth utilization of the PHY.

7. The SAS expander of claim 2 further comprising:
a virtual fabric layer coupled with the VCM; and
an Expander Link Layer (XL) coupled with the virtual fabric layer and the second PHY, the XL adapted to exchange SAS communications with legacy SAS devices,
wherein the virtual fabric layer is adapted to receive the one or more virtual SAS cells, to reassemble the one or more virtual SAS cells into the SAS communication, and to provide the SAS communication to the XL for routing to the second PHY.

8. The SAS expander of claim 7 wherein:
the virtual fabric layer is further adapted to receive a plurality of virtual SAS cells, to determine an order associated with re-assembling the plurality of virtual SAS cells into the SAS communication, and to re-assemble the plurality of virtual SAS cells into the SAS communication based on the determined order.

9. The SAS expander of claim 7 wherein:
the virtual fabric layer is further adapted to perform an arbitration process between multiple virtual pathways for a legacy SAS endpoint by temporarily establishing a legacy SAS pathway to the legacy SAS endpoint for each of the multiple virtual pathways.

10. The SAS expander of claim 9 wherein:
the virtual fabric layer is further adapted to temporarily open a legacy SAS pathway to a legacy SAS device for a first virtual pathway of the multiple virtual pathways, to provide SAS communications associated with the first virtual pathway to the XL for routing along the legacy SAS pathway, and to close the legacy SAS pathway for the first virtual pathway;
the virtual fabric layer is further adapted to temporarily open the legacy SAS pathway to the legacy SAS device for a second virtual pathway of the multiple virtual pathways, to provide SAS communications associated with the second virtual pathway to the XL for routing along the legacy SAS pathway, and to close the legacy SAS pathway for the second virtual pathway.

11. The SAS expander of claim 1 wherein:
the VCM is further adapted to receive a request to establish a virtual pathway for a SAS device, to identify a plurality of possible virtual routes between a plurality of PHYs of the SAS expander that satisfy the request, and to dynamically select one of the possible virtual routes based on a quality of service associated with each of the possible routes.

12. The SAS expander of claim 1 wherein:
the VCM is further adapted to establish a new concurrent full-duplex virtual pathway between the first PHY and the second PHY, and to exchange information over the new concurrent full-duplex virtual pathway without performing an arbitration with previously established full-duplex virtual pathways between the first PHY and the second PHY.

13. The SAS expander of claim 1 wherein:
the VCM is further adapted to receive a request to establish a full-duplex virtual pathway for a SAS device, to identify a plurality of possible virtual routes between a plurality of PHYs of the SAS expander that satisfy the request, and to dynamically select one of the possible virtual routes based on an information load associated with each of the possible routes.

14. The SAS expander of claim 1 wherein:
the VCM is further adapted to receive a request to establish a full-duplex virtual pathway for a SAS device, to identify a plurality of possible virtual routes between a plurality of PHYs of the SAS expander that satisfy the request, and to dynamically select one of the possible virtual routes based on queue levels for each of the possible routes.

15. The SAS expander of claim 1 wherein:
the VCM is further adapted to receive a request to establish a full-duplex virtual pathway for a SAS device, to identify a plurality of possible virtual routes between a plurality of PHYs of the SAS expander that satisfy the request, and to dynamically select one of the possible virtual routes based on an expected bandwidth for established connections associated with each of the possible routes.

16. The SAS expander of claim 1 wherein:
the information to exchange is SAS information encapsulated within a virtual SAS cell that includes a virtual connection identifier for routing for the virtual SAS cell over one or more full-duplex virtual pathways used in a virtual connection; and
the VCM is further adapted to establish a new full-duplex virtual pathway between the first PHY and a third PHY of the SAS expander, to receive a plurality of virtual SAS cells at the first PHY, to determine, for each of the plurality of virtual SAS cells, a route for each of the plurality of virtual SAS cells between the first PHY and one of the second PHY and the third PHY based on the connection identifier for routing the virtual SAS cells.

17. The SAS expander of claim 16 wherein:
the VCM is further adapted to determine that the virtual connection identifier for one of the plurality of virtual SAS cells specifies the new full-duplex virtual pathway for routing, to determine that the first PHY is electrically connected to the second PHY, to electrically disconnect the second PHY from the first PHY, and to electrically connect the third PHY to the first PHY for routing the one of the plurality of virtual SAS cells utilizing the new full-duplex virtual pathway.

18. A Serial Attached SCSI (SAS) expander comprising:
a first physical link (PHY);
a second PHY;
a third PHY; and
a Virtual Connection Manager (VCM) adapted to receive SAS frames, to segment the SAS frames into a plurality of virtual SAS cells, and to transmit the plurality of virtual SAS cells utilizing a plurality of concurrently established full-duplex virtual pathways directly between the first PHY and the second and third PHY.

19. A Serial Attached SCSI (SAS) expander comprising:
a first physical link (PHY);
a second PHY; and
a Virtual Connection Manager (VCM) adapted to receive a plurality of virtual SAS cells comprising segmented SAS frames at the first PHY, and to forward the plurality of virtual SAS cells utilizing a plurality of concurrently established full-duplex virtual pathways directly from the first PHY to the second PHY.

* * * * *